United States Patent [19]

Hanatani et al.

[11] Patent Number: 4,855,846
[45] Date of Patent: Aug. 8, 1989

[54] DEVICE FOR LOADING A TAPE-LIKE SUBSTANCE

[75] Inventors: Shinji Hanatani; Yoshiaki Sugiyama; Hisayoshi Chino, all of Kanagawa, Japan

[73] Assignee: Sony Corporation, Tokyo, Japan

[21] Appl. No.: 141,299

[22] Filed: Jan. 6, 1988

[30] Foreign Application Priority Data

Jan. 30, 1987 [JP] Japan ................................. 62-020278
Feb. 4, 1987 [JP] Japan ................................. 62-024045

[51] Int. Cl.⁴ ............................................ G11B 5/027
[52] U.S. Cl. .................................. 360/84; 360/130.23
[58] Field of Search ..................................... 360/84–85, 360/95, 130.23, 130.24; 242/188, 182, 197–200, 195

[56] References Cited

U.S. PATENT DOCUMENTS

3,904,148  9/1975  Cloud ................................. 360/85 X
4,486,799 12/1984  Kawamoto ..................... 360/130.23

Primary Examiner—A. J. Heinz
Attorney, Agent, or Firm—Lewis H. Eslinger; Jay H. Maioli; Donald S. Dowden

[57] ABSTRACT

In a device for loading a tape-like substance, in which the tape-like substance, such as tape, film or the like paid out of a supply reel is conveyed with air to a take-up reel's side through a duct as a tape path having a peripheral path provided along the periphery of a guide durm, a movable guide for leading the tape-like substance together with the air to the beginning of the peripheral path is disposed, so that it can be smoothly operated to load the tape-like substance.

7 Claims, 11 Drawing Sheets

DEVICE FOR LOADING A TAPE-LIKE SUBSTANCE

BACKGROUND OF THE INVENTION

1. Field of the Invention

This invention relates generally to a tape recording and/or reproducing apparatus, and more particularly is directed to a device thereof for loading a tape-like substance, in which the tape-like substance, such as tape, film or the like, is conveyed with air through a duct as a tape path. The device of this invention is best suited for an open reel tape recording and/or reproducing apparatus.

2. Description of the Prior Art

In relation to a tape recording and/or reproducing apparatus, various devices for loading a tape-like substance are already known, in which the tape-like substance is automatically conveyed with air (by suction) from a supply-reel's side to a take-up-reel's side through a predetermined tape path, for example, as disclosed in U.S. Pat. No. 3,127,120 and U.S. Pat. No. 3,334,831.

However, such a device has been applied to a magnetic recording apparatus having stationary heads and a simple tape path, so that it is difficult to apply such a device to a magnetic recording and/or reproducing apparatus which has a rotary head and a complex tape path including a peripheral path along the periphery of the rotary head.

Such a magnetic recording apparatus as to have a rotary drum and an automatic device for loading a tape-like substance by suction, has been disclosed in U.S. Pat. No. 3,940,791, U.S. Pat. No. 3,938,041 and so forth, but in such an apparatus, a tape is drawn out by suction within airtight casings as illustrated in the drawings of the documents, so that the apparatus is apt to be large. Moreover, it is difficult to apply such a device to a magnetic recording and/or reproducing apparatus having a large angle of contact of a tape with a rotary drum.

Thus, such devices as mentioned above are not applied to a magnetic recording and/or reproducing apparatus having a complex tape path for winding the tape-like substance on the periphery of the rotary head at a large angle of contact.

OBJECTS AND SUMMARY OF THE INVENTION

Accordingly, it is an object of the present invention to provide a device for loading a tape-like substance, in which a guide plate is provided in a tape path so as to have the leading end of the tape-like substance conveyed with air within the tape path from the inlet of thereof, and guided firmly to the beginning of a peripheral tape path which is disposed along the periphery of a guide drum, so that the tape-like substance is smoothly loaded without any inadvertent trouble.

Another object of the invention is to provide a device for loading a tape-like substance, as aforesaid, in which the guide plate is made movable and is removed from the tape path lest the guide plate should interfere with the movement of an entrance guide and an exit guide which are moved when recording on or reproducing from the tape-like substance after tape loading is performed, so that the travel of the tape-like substance is accurately regulated by the entrance and exit guides, because they are firmly moved to predetermined respective positions. Thus, recording on or reproducing from the tape-like substance can be performed with high accuracy, and the device can be applied to a magnetic recording and/or reproducing apparatus having such a complex tape path as to be wound on a rotary head, and a large angle of contact of the tape with the rotary head.

A further object of the invention is to provide a device for loading a tape-like substance, in which an entrance guide and an exit guide are moved to three positions: third positions spaced apart sufficient distances from a tape path when the tape-like substance is loaded with air; first positions situated nearest to a guide drum when recording on or reproducing from the tape-like substance is performed; and second positions spaced apart small distances from the guide drum when the tape-like substance is in rewind or fast-forward mode, so that when loaded with air, the tape-like substance can move without any interference of the entrance and exit guides, and loading of the tape-like substance is safely and smoothly performed; when recording on or reproducing from the tape-like substance is performed, the tape-like substance can run accurately along a tape lead provided on the guide drum, and recording or reproducing is performed with high accuracy; and when in rewind or fast-forward mode, the tape-like substance is prevented from receiving damages due to contact with the flange of entrance guide and so forth, and can run safely and smoothly at high speed.

According to an aspect of the present invention, there is provided a device for loading a tape-like substance, in which a guide plate for leading the tape-like substance together with air to the begining of a peripheral path of a tape path which extends along a guide drum, is provided so as to reciprocate from an active position where the tape-like substance is guided together with the air within the tape path, to an inactive position turned aside from the active position, or vice versa. When the tape-like substance is loaded, the guide plate is located in the active position, and when recording on or reproducing from the tape-like substance is performed, the guide plate is located in the inactive position.

Furthermore, there is provided another device for loading a tape-like substance, in which an entrance guide and an exit guide are respectively arranged near the beginning and the end of a peripheral path provided midway in a tape path, and extending along a guide drum, so as to have the tape-like substance running helically along the guide drum by the help of a tape lead provided in the periphery of the guide drum after the tape-like substance is loaded, and can be moved by a drive mechanism to a first position situated nearest among all to the guide drum within the tape path, a second position spaced a little more apart from the guide drum than the first position within the tape path, and a third position outside the tape path and largely apart therefrom.

DETAILED DESCRIPTION OF THE PREFERRED EMBODIMENT

An embodiment of the present invention applied to a device for loading a tape-like substance for an open-reel-type video tape recorder will be hereinafter described with reference to the accompanying drawings.

Figure 3:
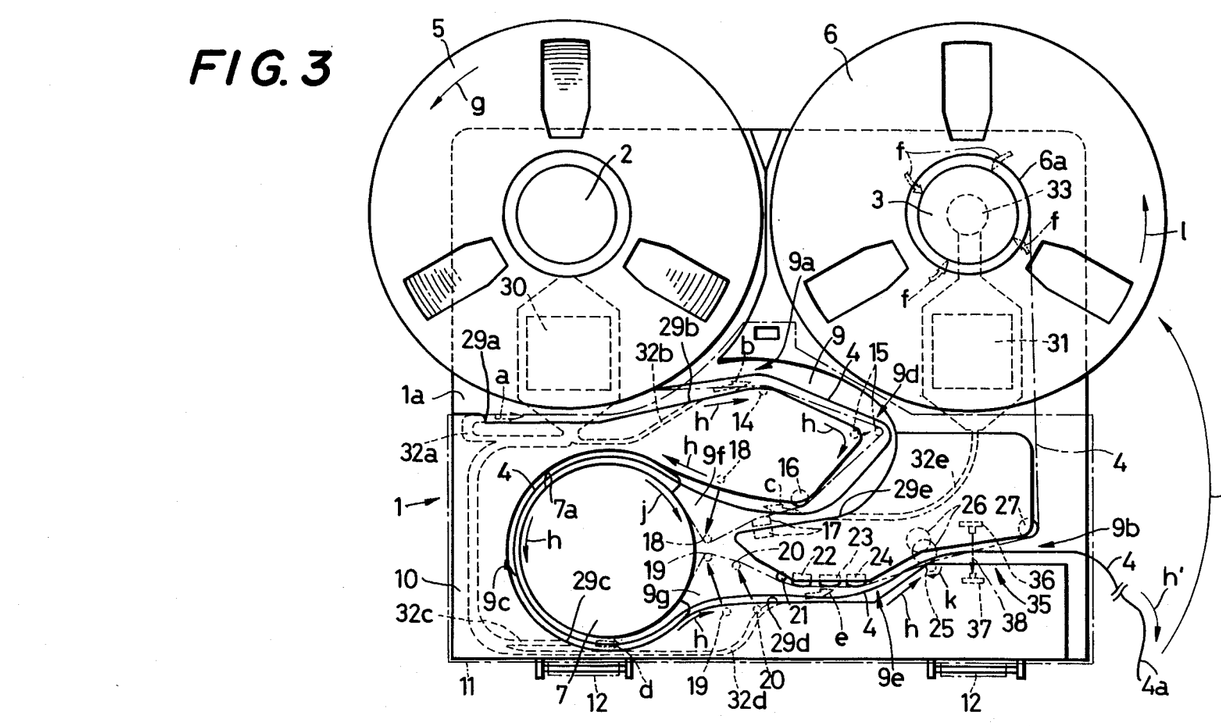
FIG. 3 is a general, front view of the device including the guide plate of FIG. 1.
Figure 4:
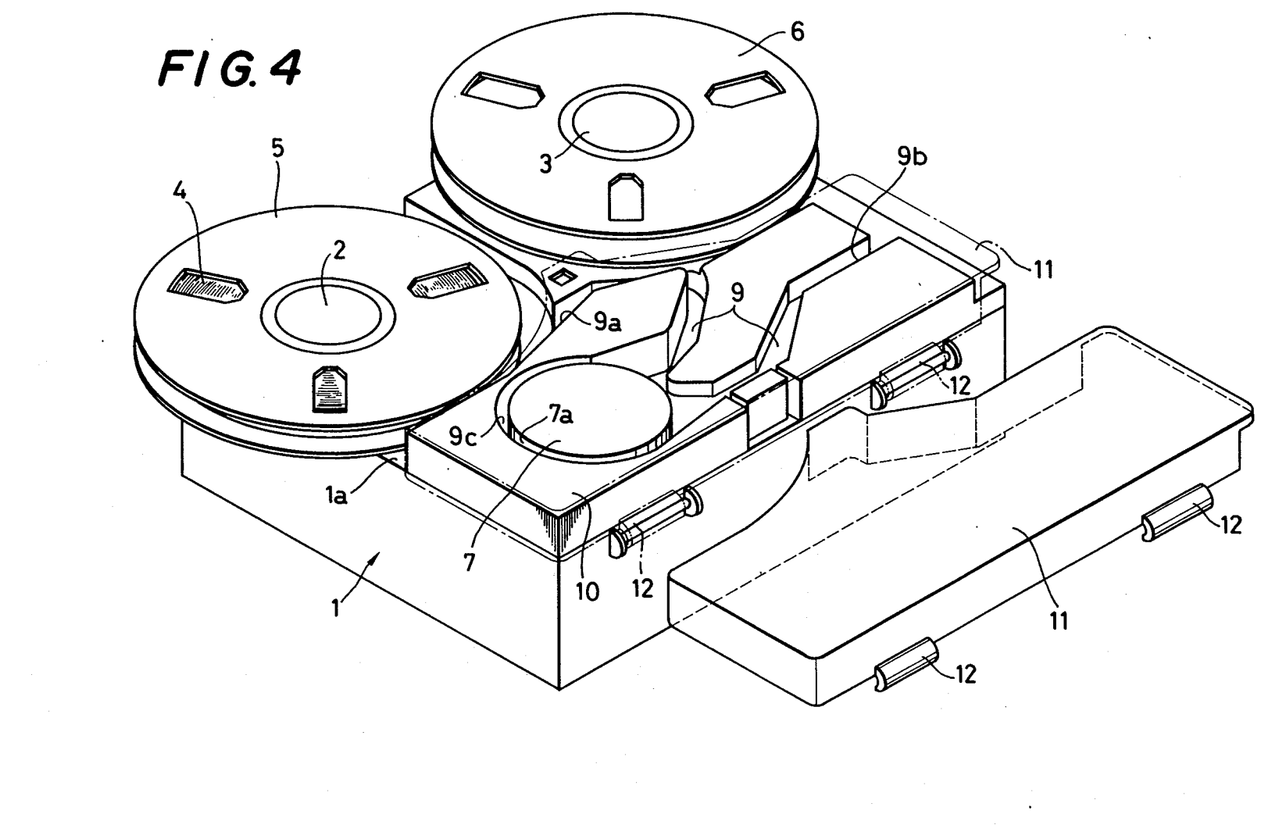
FIG. 4 is perspective view of the device of FIG. 3.

As shown in FIGS. 3 and 4, a supply reel base 2 and a take-up reel base 3 are arranged to be spaced from each other in the upper right and left positions of the front face 1a of the body 1 of an upright video tape recoder (hereinafter described as VTR), and mounted on the supply reel base 2 and the take-up reel base 3 are a supply reel 5 on which a magnetic tape 4 as a tape-like substance is wound, and a take-up reel 6 for taking up the magnetic tape 4, respectively. Moreover, a rotary head drum 7 as a guide drum is arranged on the front face 1a of the VTR 5 body 1 nearly under the supply reel 5.

A tape path 9 formed in the front face 1a of the VTR's body 1 nearly below the supply and take-up reels 5 and 6, has an inlet 9a which is opened near the lower part of the supply reel 5, an outlet 9b which is opened in such a position as to be spaced apart a predetermined distance from the lower part of the take-up reel 6, and a peripheral path 9c of laid U-shape which is provided along the periphery 7a of the rotary head drum 7. Moreover, a supply side path 9d from the inlet 9a to the begining 9f of the peripheral path 9c is of laid U-shape, and a take-up side path 9e from the end 9g of the peripheral path 9c to the outlet 9b gradually rises toward the outlet 9b, so that as a whole, the tape path 9 describes an unsharp curve crooked in zigzag.

The tape path 9 is formed like a duct with a front panel 10 attached to the front face 1a of the VTR's body 1, and an openable front cover 11 swingable on hinges 12 which are secured to the VTR's body 1. Note that the front cover 11 is made of transparent synthetic resin, and locked by a locking means (not shown) when closed as indicated in chain-dotted lines in FIGS. 3 and 4. Moreover, the tape path 9 is lower at the side of the inlet 9a, and higher at the side of the outlet 9b, in order to make the magnetic tape 4 helically wind on the periphery 7a of the rotary head drum 7, so that there is a difference in height between the supply reel 5 and take-up reel 6, that is, the former is lower than the latter.

Arranged along the supply side path 9d of the tape path 9 are a guide post 14, a tension detector 15, a guide roller 16, a full-width erasing head 17, an entrance guide 18 and so forth, and arranged along the take-up side path 9e therefore are an exit guide 19, a tape guide 20, an impedance roller 21, an audio erasing head 22, an audio recording/reproducing head 23, an audio monitoring head 24, a capstan 25, a pinch roller 26, a guide roller 27 and so forth.

A plurality of air outlets 29a to 29e are provided along the lower wall of the tape path 9 and connected to one or more blowers 30, 31 through respective air paths 32a to 32e. Moreover, the air inlet 33 of one 31 of the blowers communicates with a plurality of air inlets (not shown) which are provided in the periphery of the hub 6a of the take-up reel 6, so that the leading end 4a of the magnetic tape 4 is attracted by suction to the periphery of the hub 6a to be wound on the take-up reel 6.

A sensor 35 arranged at the side of the outlet 9b of the tape path 9, comprises a light emitting element 36 and a photosensor 37 which are respectively disposed on opposite sides of the tape path 9, and light emitted by the light emitting element 36 crosses the tape path 9 and strikes the photosensor 37.

Now, the loading operation of the magnetic tape 4 will be hereinafter described.

As shown in FIG. 3, as soon as the blowers 30 and 31 are put in action, air is blown off from the plurality of air outlets 29a to 29e to the tape path 9 in directions of arrows a to e, and at the same time, air sucked from the periphery of the hub 6a of the take-up reel 6 in a direction of arrow f, flows to the air inlet 33 of the blower 31.

After the leading end 4a of the magnetic tape 4 wound on the supply reel 5 is made to be brought near the inlet 9a of the tape path 9, the supply reel 5 is mannally or automatically rotated in a direction of arrow g so as to make the magnetic tape 4 pay out of the supply reel 5. Thus, the magnetic tape 4 is conveyed with air blown off in the direction of arrows a to e from the air outlets, as indicated in solid lines in FIG. 3, that is, the magnetic tape 4 is conveyed in a direction of arrow h from the inlet 9a to the outlet 9b through the tape path 9, in turn, through the supply side path 9d, the peripheral path 9c and the take-up side path e.

When the leading end 4a of the magnetic tape 4 is to reach the outlet 9b of the tape path 9, the leading end 4a intercepts the ray of light 38 emitted by the light emitting element 36, so that the sensor 35 detects the leading end 4a because light does not strike on the photosensor 37. Then, a timer (not shown) is put in action and after a predetermined time, the blower 30 is automatically stopped.

During the predetermined time to which the timer is set (strictly speaking, it is necessary to add the time required until the motor of the blower 30 stops, because the motor rotates by inertia even after the electric power is off), the leading end 4a of the magnetic tape 4 is paid out of the tape path 9 through the outlet 9b thereof by a predetermined length in a direction of arrow h', and as soon as the blower 30 stops, the magnetic tape 4 is not conveyed further with air, because air is not blown off from the air outlets 29a to 29b to the tape path 9. Thus, when the supply reel 5 has been manually rotated in the direction of arrow g , we may stop rotating of the supply reel 5, and when the supply reel 5 has been automatically rotated, the supply reel 5 is automatically stopped.

Then, the leading end 4a of the magnetic tape 4 is raised by hand in a direction of arrow i, and firmly wound on the hub 6a of the take-up reel 6 by suction of the blower 31 as indicated in chain-dotted lines in FIG. 3. Thereafter, the blower 31 is also stopped. Note that it is not always necessary to wind the leading end 4a of the magnetic tape 4 on the hub 6a of the take-up reel 6 by suction as mentioned above, but the leading end 4a may be engaged the hub 6a by such engaging means as to make the leading end 4a insert into a slit which is provided in the hub 6a, or by other engaging means.

Next, when a stand-by button is depressed, the rotary head drum 7 is, firstly, rotated in a direction of arrow j as shown in FIG. 3, and then, the tension detector 15, the full-width erasing head 17, the entrace guide 18, the exit guide 19, the tape guide 20 and other movable members are moved from a backward position indicated in dotted lines to a forward position indicated in chain-dotted lines in FIG. 3. Thus, the magnetic tape 4 is helically wound at a predetermined angle on the periphery 7a of the rotary head drum 7, and is extended from head or guide to head or guide.

Next, when a play button is depressed, the capstan 25 is, firstly, rotated in a direction of arrow k as shown in FIG. 3, and then, the magnetic tape 4 is pressed against the capstan 25 by the pinch roller 26, and at the same time, the supply reel 5 and take-up reel 6 are rotated in directions of arrows g and l, respectively. The magnetic tape 4 on a tension runs at constant speed in the direction of arrow h within the tape path 9, and desired recording or reproducing is performed.

If the magnetic tape 4 is inadvertently cut, or completely wound on the take-up reel 6 or the supply reel 5 during recording or reproducing, or fast-forward mode or rewind mode, and thereby, the light 38 emitted by the light emitting element 36 again strikes the photosensor 37, a tape-running stop circuit (not shown), for example, is put in action on a judgement that there is no magnetic tape 4 within the tape path 9, so that the rotary head drum 7 and a system for moving the magnetic tape 4 are automatically stopped.

Now, a drive mechanism for driving the entrance guide 18, the exit guide 19 and a guide plate 54 which are provided near the beginning 9f and end 9g of the peripheral path 9c of the tape path 9, will be hereinafter described with reference to FIGS. 1A to 2.

The entrance guide 18 and the exit guide 19 are mounted on respective sliders 40a and 40b through respective supporting blocks 18a and 19a, and on the slider 40b, the tape guide 20 is also mounted. The sliders 40a and 40b are reciprocatory in directions of arrows m or m', and n or n' along a pair of guide rails 41a and 41b, respectively. The guide rails 41a and 41b are fixed to the front face 1a of the VTR's body 1, and between the guide rails 41a and 41b, a stop 42 for the sliders 40a and 40b projects from the front face 1a. Moreover, a pair of arms 44a and 44b swung on respective fulcrum pins 43a and 43b which project from the front face 1a of the VTR's body 1, are connected to the respective sliders 40a and 40b through rods 46a and 46b surrounded by springs 45a and 45b, and links 47a and 47b connected to the rods 46a and 46b.

A driving shaft 49 is rotatably supported by the VTR's body 1 and driven by a geared motor 48. A plate 50 formed integrally with the driving shaft 49 is connected to one 44a of the arms by a link 51, and further, the arm 44a is connected to the other arm 44b by a link 52.

Figure 1A:
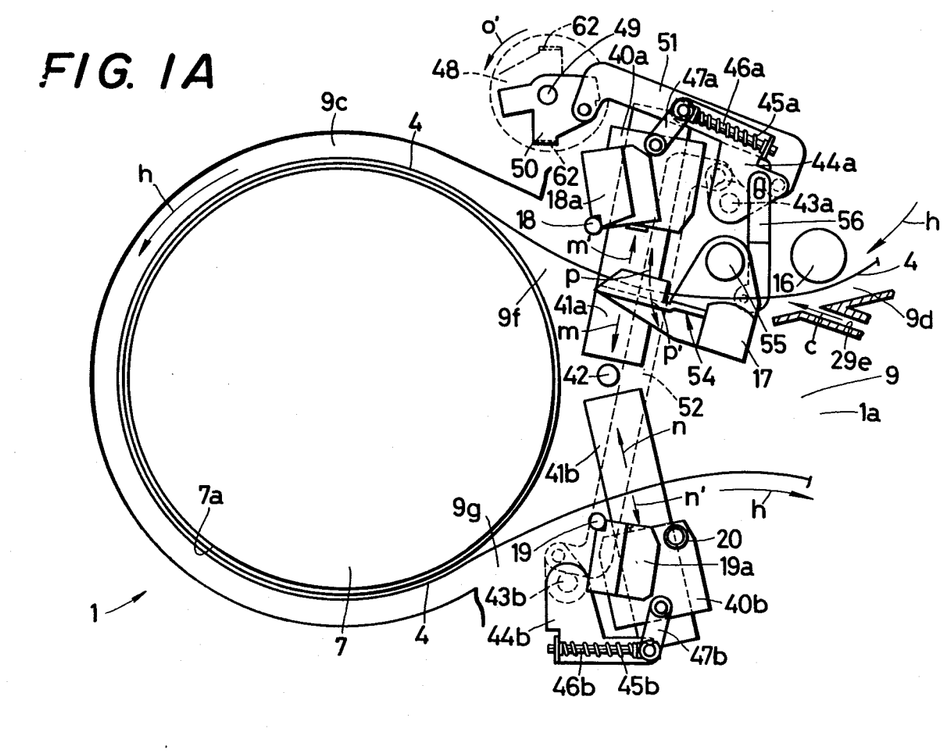
FIGS. 1A and 1B are enlarged front views to show the action of a guide plate included in a device for loading a tape-like substance according to an embodiment of this invention.
Figure 2:
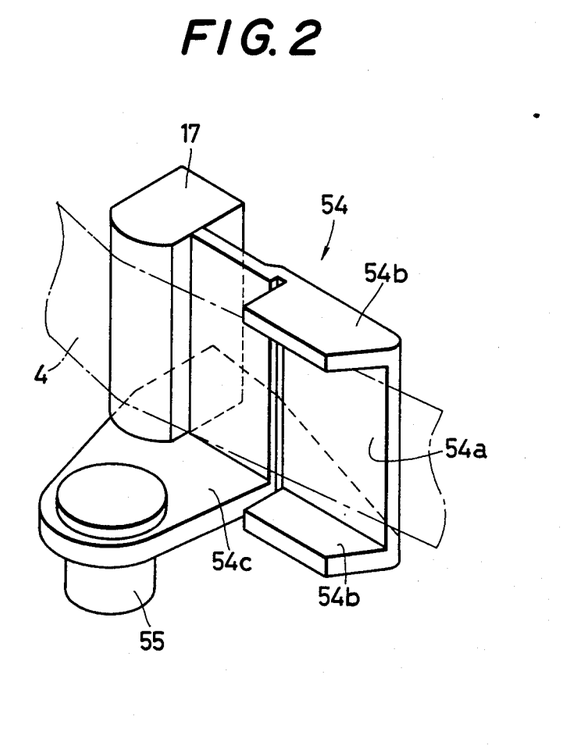
FIG. 2 is a perspective view of the guide plate of FIGS. 1A and 1B.

FIG. 1A, the guide plate 54 lies near the beginning 9f of the peripheral path 9c, and that within a reciprocation path of the supporting block 18a which extends in a direction of arrows m and m'. The guide plate 54 shown in FIG. 2 has a U-shaped section comprising a main guide plate 54a as the web-portion thereof and auxiliary guide plates 54b as the flange-portions thereof, and further, an arm 54c projecting from the guide plate 54 is swung in a direction of arrows p and p' on a fulcrum pin 55 which projects from the VTR's body 1. Moreover, the guide plate 54 is connected to the arm 44a by a link 56, and the full-width erasing head 17 is secured to an end position of the arm 54c in opposed relation with that of the guide plate 54 with respect to the fulcrum pin 55, so as to be swingable in the direction of arrows p and p'.

Thus, when the magnetic tape 4 is loaded as shown in FIG. 1A, the plate 50 is rotated in a direction of arrow o' by the geared motor 48, so that the entrance and exit guides 18 and 19 and the tape guide 20 are moved in the direction of arrows m' and n' to be located at the outside of the tape path 9, and never interfere with conveyance of the magnetic tape 4 in the direction of arrow h within the tape path 9. Moreover, at the time when the magnetic tape 9 is loaded, the guide plate 54 moved in the direction of arrow p, is located in an active position within the tape path 9, and on the contrary, the full-width erasing head 17 is located at the outside of the tape path 9.

Thus, the guide plate 54 comprising the main and auxiliary guide plates 54a and 54b, firmly guides the leading end 4a of the magnetic tape 4 conveyed within the tape path 9, to the beginning 9f of the peripheral path 9c with air blown off in the direction of arrow c from the air outlet 29e, so that the leading end 4a is smoothly led from the supply side path 9d to the peripheral path 9c.

Figure 1B:
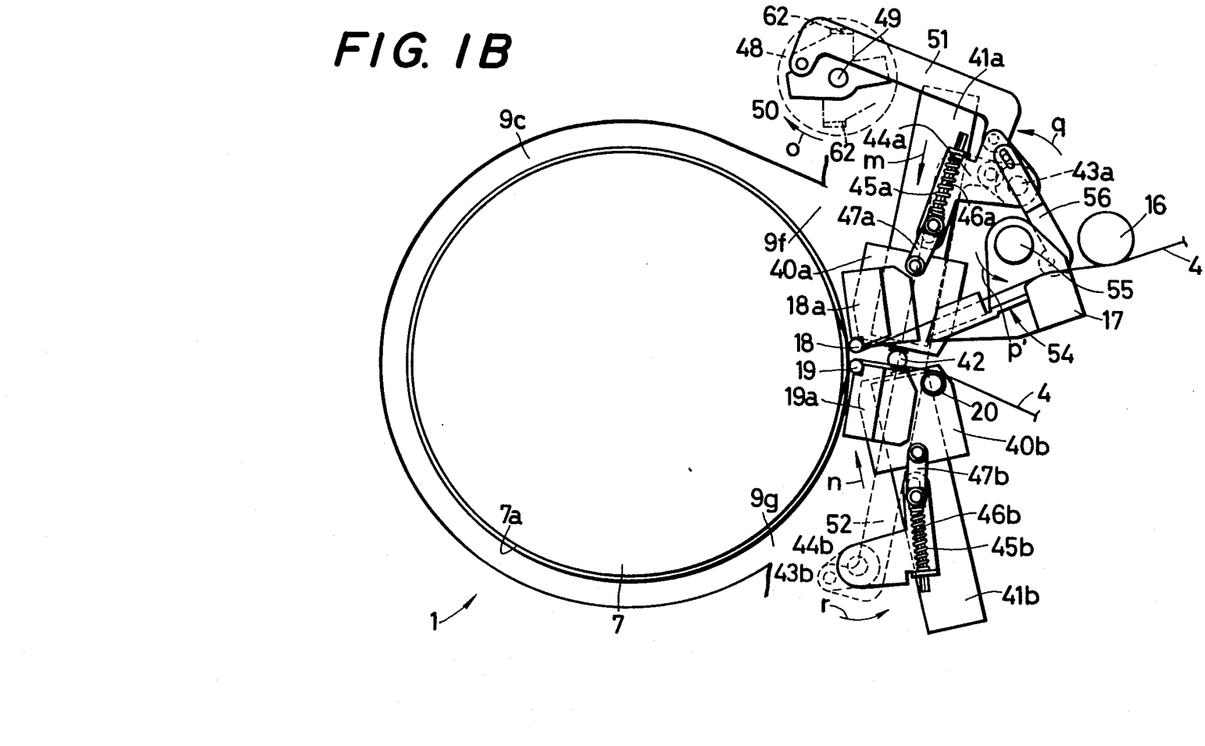

Next, when the stand-by button is depressed as shown in FIG. 1B after the magnetic tape 4 is completely loaded, the plate 50 is rotated in a direction of arrow O by the geared motor 48, so that one 44a of the arms is swung in a direction of arrow g through the link 51, and further, the other arm 44b is swung in a direction of arrow r through the link 52. As the result, the sliders 40a and 40b are moved in the directions of arrows m and n by the arms 44a and 44b through the rods 46a and 46b and links 47a and 47b, respectively, so that the entrance and exit guides 18 and 19 and the tape guide 20 are located in forward positions near the periphery 7a of the rotary head drum 7, and at that time, the sliders 40a and 40b are pressed against the stop 42 due to the forces of the springs 45a and 45b, respectively, and locked because the center lines of the links 47a and 47b deviate a little from those of the rods 46a and 46b.

Meanwhile, as the guide plate 54 is moved in the direction of arrow p' by the arm 44a rotated in the direction of arrow q through the link 56, prior to the movement of the slider 40a in the direction of arrow m, the supporting block 18a of the entrance guide 18 moved in the direction of arrow m by the slider 40a, does not inadvertently abut against the guide plate 54. In other words, the guide plate 54 is swung in the direction of arrow p' without meeting any obstruction by the entrance guide 18 and supporting block 18a which are moved in the direction of arrow m, and located at the outside of the tape path 9, and at the same time, the full-width erasing head 17 is located in the tape path 9.

Thus, the magnetic tape 4 is helically wound on the periphery 7a of the rotary head drum 7 with high accuracy at a predetermined angle of contact, and the full-width erasing head 17 comes in contact with the magnetic tape 4, so that recording on, or reproducing from the magnetic tape 4 is performed under the state that the tape running path is accurately regulated with respect to the rotary head drum 7.

Now, a drive mechanism of the entrance and exit guides 18 and 19 will be hereinafter described in detail with reference to FIGS. 5A to 8.

Figure 5A:
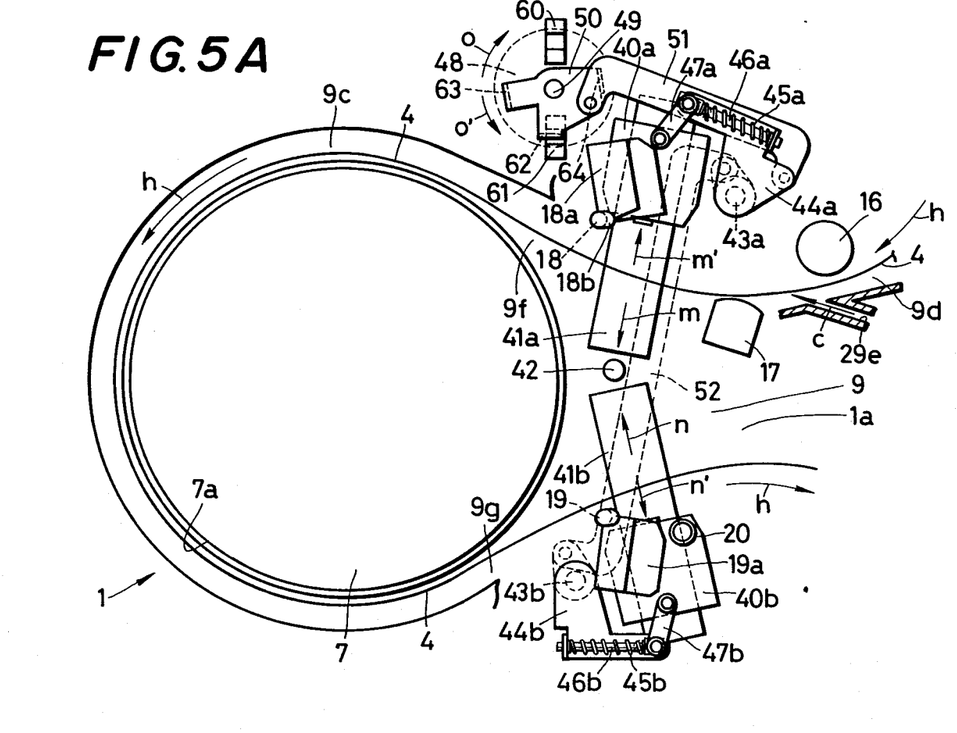
FIGS. 5A to 5C are enlarged front views to show the actions of an entrance guide and an exit guide.

As shown in FIG. 5A, two sensors 60 and 61 are secured to the front face 1a of the VTR's body 1 in position of point symmetry with respect to the driving shaft 49, and each of them has a light emitting element and a photosensor (not shown). When the light emitted by the light emitting element strikes the photosensor, signal (0) is made, and when the light emitted by the light emitting element can not strike the photosensor due to the obstruction by a shutter, signal (1) is made. In addition, three shutters 62, 63 and 64 are provided on the outer periphery of the plate 50.

Figure 6:
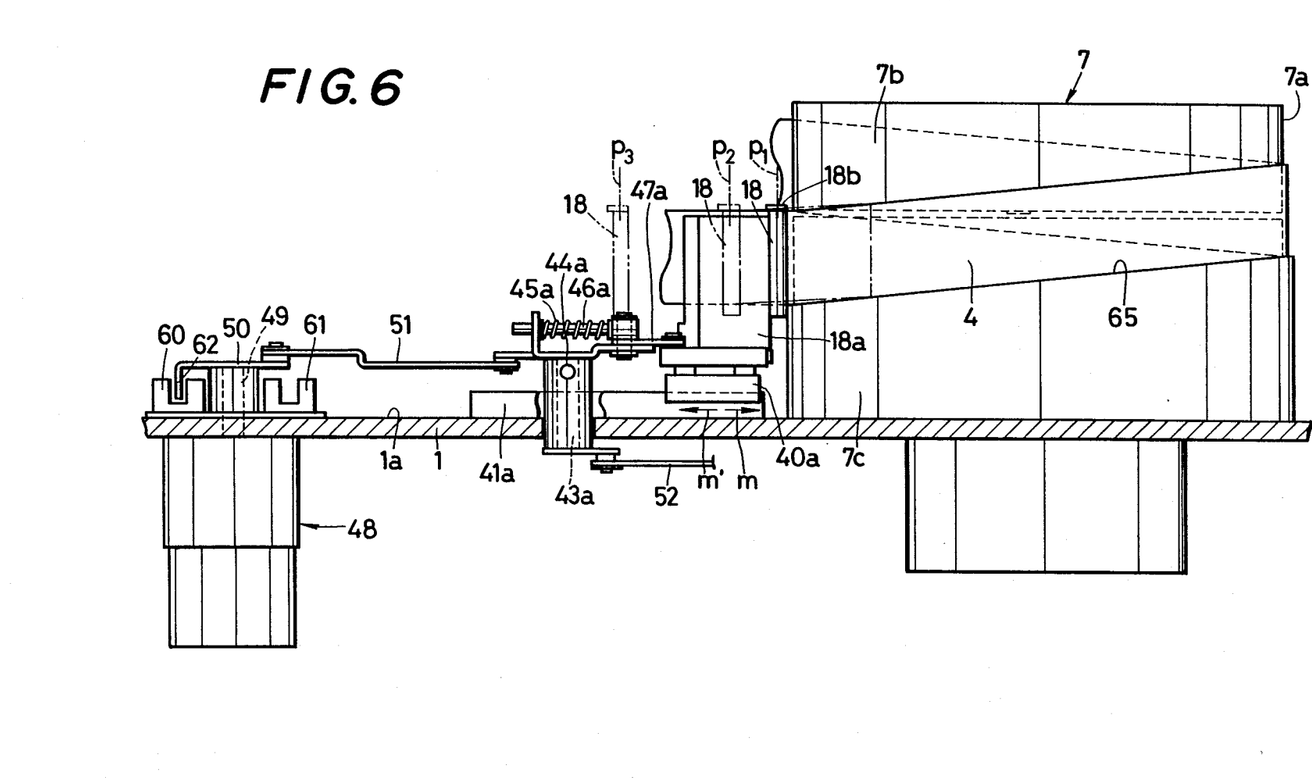
FIG. 6 is a development viewed in a direction of arrows VI—VI on FIG. 5B.
Figure 7:
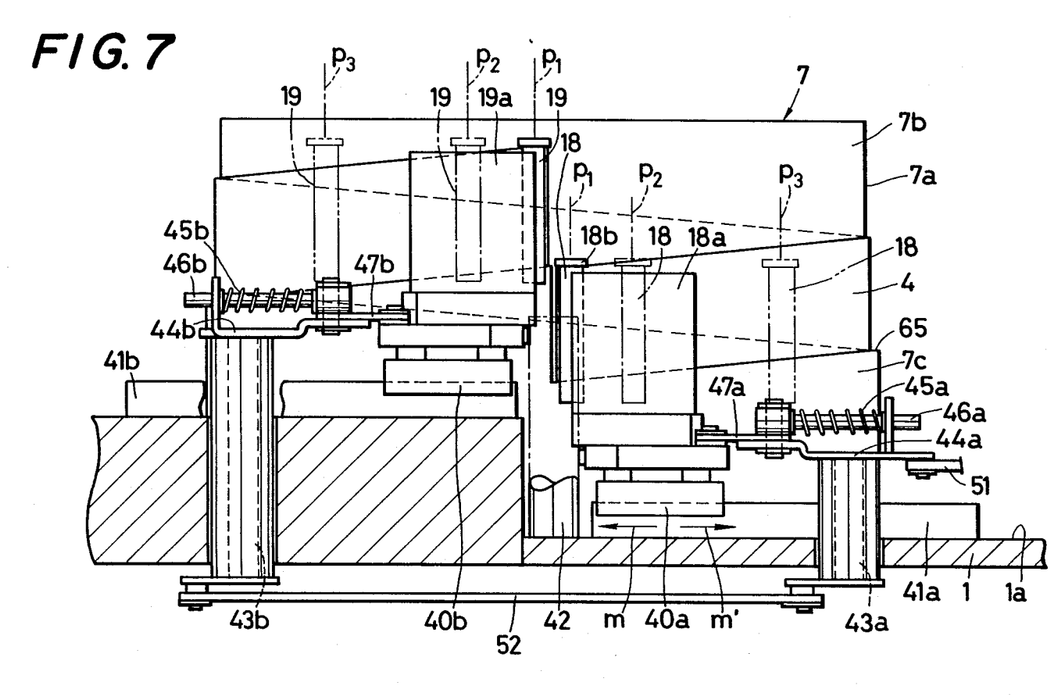
FIG. 7 is a development viewed in a direction of arrows VII—VII on FIG. 5B.
Figure 8:
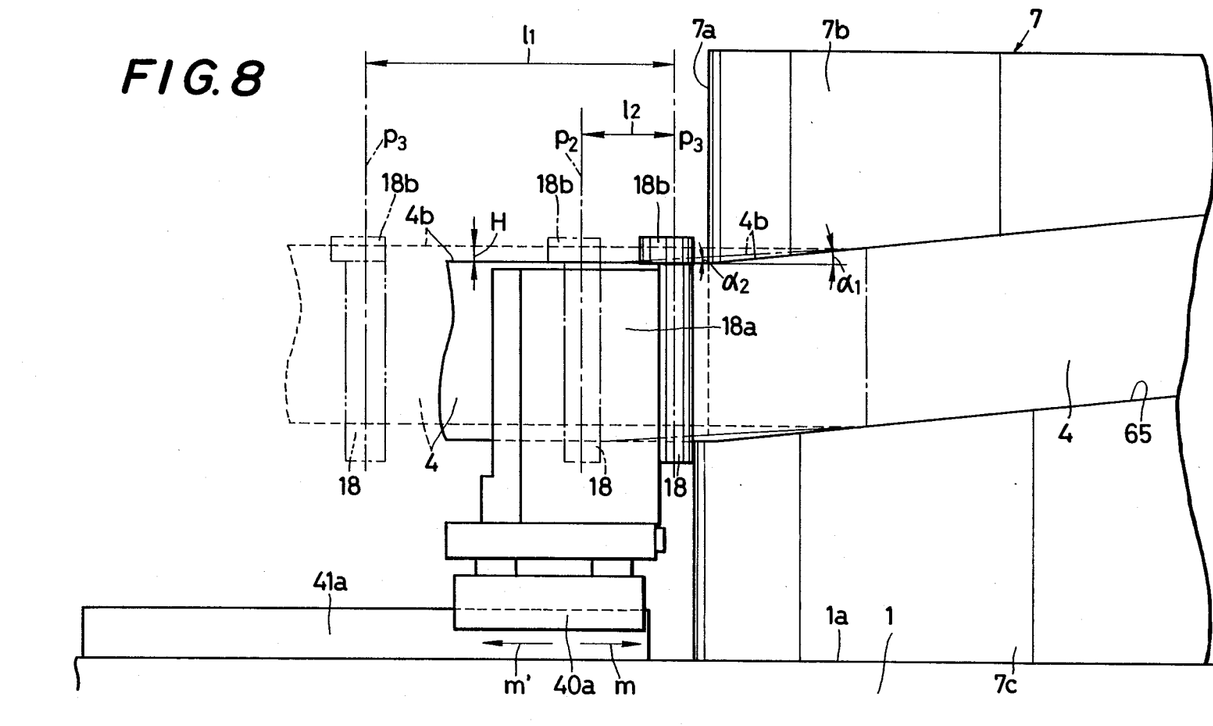
FIG. 8 is a partial, enlarged development on FIG. 7.

When the magnetic tape 4 is to be loaded as shown in FIG. 5A, the plate 50 is rotated in the direction of arrow o' by the geared motor 48, and the entrance and exit guides 18 and 19, and the tape guide 20 are moved in the directions of arrows m' and n' from near the beginning 9f and end 9g of the peripheral path 9c, and the entrance and exit guides 18 and 19 are located in third positions $P_3$ largely outside the tape path 9 as indictated in two dots-and-dash lines in FIGS. 6 to 8, and as shown in FIG. 5A, it is detected by the sensor 60 making signal (0), and the sensor 61 meeting the obstruction by the shutter 62 and making signal (1), that the entrance and exit guides 18 and 19 are in the third positions $P_3$, so that the geared motor 48 is stopped.

Thus, when the magnetic tape 4 is loaded with air, the entrance and exit guides 18 and 19, and the tape guide 20 do not interfere with conveyance of the magnetic tape 4 to the direction of arrow h at all, so that the magnetic tape 4 is safely and smoothly loaded in the tape path 9.

Figure 5B:
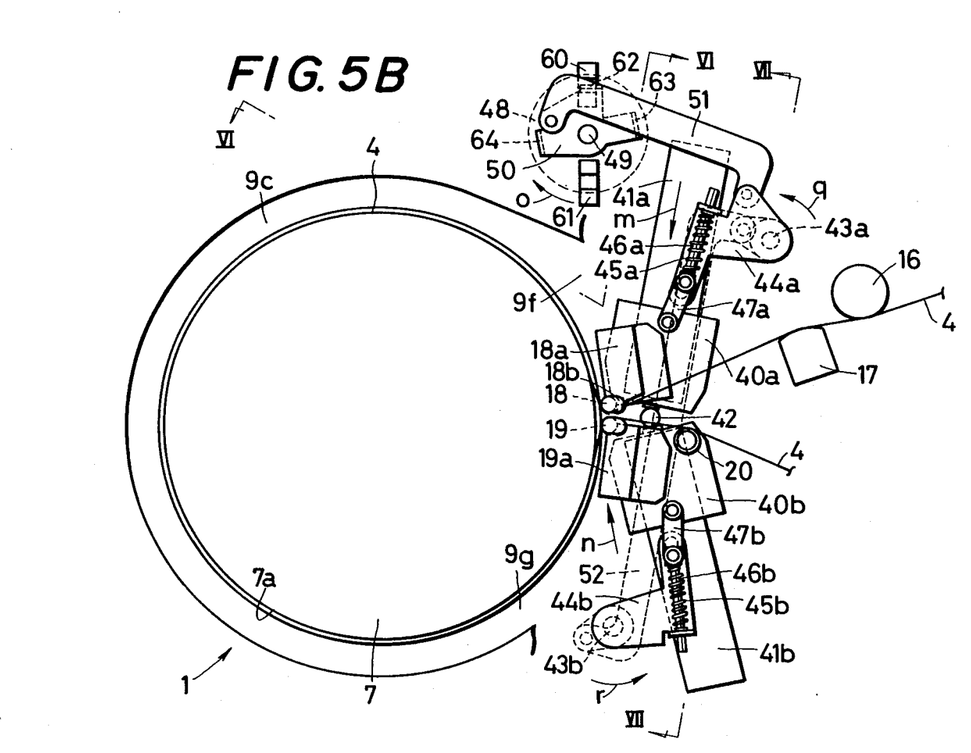

Next, when the stand-by button is depressed after the magnetic tape 4 is completely loaded, the plate 50 is rotated in the direction of arrow o by the geared motor 48 as shown in FIG. 5B; the arm 44a is swung in the direction of arrow q by the plate 50 through the link 51; the arm 44b is swung in the direction of arrow r by the arm 44a through the link 52; and the sliders 40a and 40b are moved in the directions of arrows m and n by the arms 44a and 44b through the rods 46a and 46b, and the links 47a and 47b, respectively, so that the entrance and exit guides 18 and 19 are located in first positions $P_1$ very adjacent to the periphery 7a of the rotary head drum 7 as indicated in solid lines in FIGS. 6 to 8, and also the tape guide 20 is located near the periphery 7a of the rotary head drum 7. Moreover, it is detected, as shown in FIG. 5B, by the sensor 61 making signal (0), and the sensor 60 meeting the obstruction by the shutter 62 and making signal (1), that the entrance and exit guides are in the first positions $P_1$, so that the geared motor 48 is stopped. Note that at that time, the sliders 40a and 40b are pressed against the stopper 42 due to the forces of the springs 45a and 45b, respectively and locked because the center lines of the links 47a and 47b deviate a little those of the rods 46a and 46b.

Thus, as shown in FIGS. 6 to 8, the magnetic tape 4 is helically wound with high accuracy on the periphery 7a of the rotary head drum 7 at a predetermined angle of contact along a tape lead 65. Note that the rotary head drum 7 comprises an upper rotary drum 7b and a lower stationary drum 7c, and the tape lead 65 is formed in the periphery of the lower stationary drum 7c.

When the play button is thereafter depressed, the magnetic tape 4 led with high accuracy by tape lead 65 runs at constant speed along the periphery 7a of the rotary head drum 7, so that recording on or reproducing from the magnetic tape 4 is accurately performed.

Figure 5C:
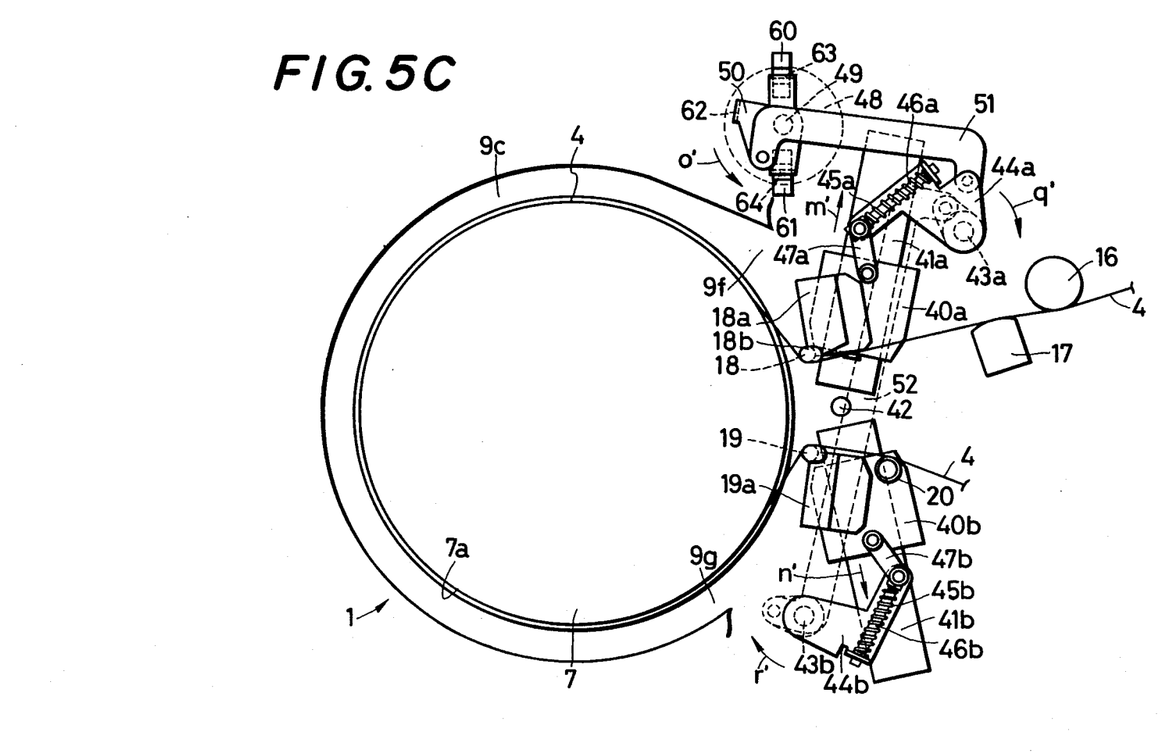

Next, when the rewind button or fast-forward button is depressed, the plate 50 is rotated a little in the direction of arrow o' by the geared motor 48 as shown in FIG. 5C; the arm 44a is swung a little in a direction of arrow q' by the plate 50 through the link 51; the arm 44b is swung a little in a direction of arrow r' by the arm 44a through the link 52; and the sliders 40a and 40b are moved a little in the directions of arrows m' and n' by the arms 44a and 44b through the rods 46a and 46b, and the link 47a and 47b, respectively, so that the entrace and exit guides 18 and 19 are located in second positions $P_2$ within the tape path 9 so as to be spaced a little more apart from the periphery 7a of the rotary head drum 7 than the first positions $P_1$ as indicated in chain-dotted lines in FIGS. 6 to 8, and also the tape guide 20 is located within the tape path 9.

At that time, the status of the entrance and exit guides 18 and 19 located in the second positions $P_2$, is detected by the sensors 60 and 61 which meet the respective obstructions by the shutters 63 and 64 to make signals (1), so that the geared motor 48 is stopped.

In the embodiment, as shown in FIG. 8, the distance $l_1$ between the first position $P_1$ and the third position $P_3$ is about 44 mm, and the distance $l_2$ between the first position $P_1$ and the second position $P_2$ is about 10 mm. In addition, when the entrance guide 18 is moved to the third position $P_3$, the upper edge 4b of the magnetic tape 4 which becomes free from the entrance guide 18, rises to a position indicated in dotted lines in FIG. 8, and displacement H of the upper edge 46 caused thereby as shown in FIG. 8 is 20 to 30 mm.

Thus, angle $\alpha_1$ made by the upper flange 18b of the entrance guide 18 in the first position $P_1$ with the upper edge 4b of the magnetic tape 4 is larger enough than angle $\alpha_2$ made by the upper flange 18b of the entrance guide 18 in the second position $P_2$ with the upper edge 4b of the magnetic tape 4, so that the magnetic tape 4 which runs at high speed, does not run on the upper flange 18b of the entrance guide 18, and does not suffer any damage.

According to the above device for loading the tape-like substance, the guide plate 54 guides the magnetic tape 4 together with the air to the beginning end 9f of the peripheral path 9c, so that the leading end 4a of the magnetic tape 4 conveyed from the inlet 9a of the tape path 9 is firmly led to the peripheral path 9c. Moreover, the guide plate 54 does not interfere with the movement of the entrance guide 18 at the time when recording on or reproducing from magnetic tape 4 is performed, because the mobile guide plate 54 is moved to the outside of the tape path 9 beforehand.

According to another feature of the invention, the entrance and exit guide 18 and 19 are located in the three positions: the third positions $P_3$ outside the tape path 9 when the magnetic tape 4 is loaded; the first positions $P_1$ situated nearest among all to the guide drum 7 when recording on, or reproducing from the magnetic tape 4 is performed; and the second positions $P_2$ spaced a little apart from the guide drum 7 when the magnetic tape 4 is in rewind mode or fast-forward mode.

What is claimed is:

1. A device for loading a tape-like substance comprising:
   a supply reel;
   a take-up reel;
   a guide drum;
   path-defining means defining a tape path extending from an inlet for receiving said tape-like substance from the supply reel to an outlet for supplying said tape-like substance to the take-up reel, said tape path including a peripheral path extending along the periphery of the guide drum;
   means defining a plurality of air outlets along the tape path; and at least one blower for blowing air from the plurality of air outlets into the tape path, wherein the tape-like substance is paid out of the supply reel and conveyed with assistance by the air blown from the plurality of air outlets, from said inlet to said outlet through said peripheral path;

the device further comprising:

a guide plate for leading said tape-like substance together with the air to the beginning of said peripheral path; and a drive mechanism for moving said guide plate in either direction between an active position and an inactive position, said guide plate in said active position leading said tape-like substance together with the air to the beginning of said peripheral path in order to facilitate loading of said tape-like substance and in said inactive position avoiding interference with movement of said tape-like substance in order to facilitate movement of said tape-like substance between said supply reel and said take-up reel.

2. A device according to claim 1, further comprising a pair of tape guides for regulating a state of said tape-like substance wound on said guide drum, and wherein said drive mechanism moves said pair of tape guides to nonregulating positions that facilitate unwinding of said tape-like substance from said guide drum and to regulating positions that facilitate winding of said tape-like substance on said guide drum at a predetermined angle of contact, and means for interlocking said drive mechanism, said pair of tape guides, and said guide plate for coordinated movement.

3. A device according to claim 2, wherein said nonregulating positions comprise load positions spaced apart from said guide drum so as to enable said tape-like substance to load easily, and fast-forward/reverse positions situated between said load positions and said regulating positions, and capable of partially unwinding said tape-like substance wound on said guide drum.

4. A device according to claim 2, wherein one of said air outlets is positioned nearer than others thereof to said peripheral path and said guide plate is disposed between said peripheral path and said one of said air outlets.

5. A device according to claim 2, wherein said path-defining means includes a lower wall and said guide plate has a lower plate capable of connecting with said lower wall and a side plate which makes a right angle with said lower plate.

6. A device according to claim 2, further comprising a stationary head, said guide plate being formed integrally with said stationary head and said tape-like substance being advanced past said stationary head.

7. A device for loading a tape-like substance, in which the tape-like substance is paid out by a supply reel and is taken up by a take-up reel after helically running along the periphery of a rotary drum, the device comprising:

a pair of tape guides for regulating the angle of contact of said tape-like substance wound on said rotary drum and a drive mechanism for moving said pair of tape guides selectively to a record/playback position, where they facilitate running of said tape-like substance around said rotary drum at a given speed and a predetermined angle of contact; a load position spaced apart from said rotary drum, where they facilitate surrounding of said rotary drum by said tape-like substance in a tape loading operation; and a fast-forward/reverse position situated between said load and record/playback positions, where they facilitate partially unwinding said tape-like substance from said rotary drum and the running of said tape-like substance between said supply reel and said take-up reel at a speed higher than said given speed.

* * * * *